United States Patent [19]

Dany et al.

[11] 4,009,137
[45] Feb. 22, 1977

[54] INTUMESCENT FLAME-RETARDANT COATING COMPOSITIONS

[75] Inventors: Franz-Josef Dany, Erftstadt Lechenich; Joachim Wortmann, Turnich; Joachim Kandler, Erftstadt Lechenich, all of Germany

[73] Assignee: Hoechst Aktiengesellschaft, Cologne, Germany

[22] Filed: Nov. 26, 1974

[21] Appl. No.: 527,446

[30] Foreign Application Priority Data

Nov. 30, 1973 Germany .......................... 2359699

[52] U.S. Cl. .................. 260/29.6 MP; 260/33.4 R
[51] Int. Cl.² ......................................... C08L 31/04
[58] Field of Search ............. 260/45.9 NP, 29.6 N, 260/29.6 MP, DIG. 24; 106/15 FP

[56] References Cited

UNITED STATES PATENTS

| | | | |
|---|---|---|---|
| 3,423,343 | 1/1969 | Barnett | 260/45.9 NP |
| 3,513,114 | 5/1970 | Hahn | 260/45.9 NP |
| 3,562,197 | 2/1971 | Sears | 260/45.9 NP |
| 3,654,190 | 4/1972 | Levine | 260/45.9 NP |
| 3,658,579 | 4/1972 | Ottinger | 260/45.9 NP |
| 3,681,273 | 8/1972 | Kelly | 260/DIG. 24 |
| 3,733,289 | 5/1973 | Burns | 260/45.9 NP |

*Primary Examiner*—Paul R. Michl
*Attorney, Agent, or Firm*—Connolly and Hutz

[57] ABSTRACT

Production of intumescent flame-retardant coating compositions which substantially contain a film-forming binder, an ammonium polyphosphate, one or more substances carbonizing under the action of heat, dispersing agents and fillers, if desired. The compositions contain more particularly an ammonium polyphosphate of the general formula:

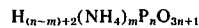

$$H_{(n-m)+2}(NH_4)_m P_n O_{3n+1}$$

in which $n$ stands for a whole number averaging a value of more than 400 up to about 800 and the ratio of $m{:}n$ is about 1.

5 Claims, No Drawings

INTUMESCENT FLAME-RETARDANT COATING COMPOSITIONS

The present invention relates to intumescent flame-retardant coating compositions containing substantially a film-forming binder, an ammonium polyphosphate, one or more substances carbonizing under the action of heat, dispersing agents and fillers, if desired, the ammonium polyphosphate having a degree of condensation which beneficially influences the properties of the coating compositions.

Coating compositions, which are intumescent under the action of heat and produce a substantially flame-retardant heat-retaining layer, are commonly used for flameproofing wooden or steel structures. The coating compositions used generally comprise a blend of a film-forming binder with an ammonium polyphosphate and one or more substances which carbonize under the action of heat.

German Patent Specification "Offenlegungsschrift" 1 669 228, for example, is noted to describe intumescent flame-retardant coating compositions containing, in aqueous dispersion, a polyvinyl acetate emulsion as a film-forming binder, a solvent softener, a carbonaceous substance and an ammonium polyphosphate of the formula:

in which $n$ stands for a whole number averaging a value within the range about 20 and 400, $m/n$ stands for a value within the range about 0.7 and 1.1, and $m$ represents a maximum value of $n+2$. The above materials are used in a proportion within the range about 30 and 90 weight %, based on the total coating composition. The carbonaceous substance may be selected, for example, from urea/formaldehyde, melamine/formaldehyde, dipentaerythritol, tripentaerythritol, chlorinated paraffins, dicyandiami-de, melamine or blends thereof. The above known coating masses may, for example, be composed of:

- 10–30 weight % of solid latex in emulsion,
- 1–3 weight % of solvent softener, based on the weight of solid latex,
- 10–30 weight % of carbonaceous substance, based on the total weight of solid material, and
- 12–30 weight % of ammonium polyphosphate, based on the total weight of solid material.

In view of the fact that the above coating compositions are more or less in contact with the moist atmosphere, it is desirable for them to contain extensively water-insoluble ammonium polyphosphate to inhibit its being washed out with the passage of time from the coating composition, whereby the ammonium polyphosphate would be deprived of its flame-retardant effect. The coating composition has a satisfactory consistency if, after preparation and prolonged storage, it has a subtantially homogeneous viscosity and remains free from phase separation phenomena which more particularly occur upon the sedimentation of ammonium polyphosphate. The phosphate component is very likely to sediment in all those cases in which the coating composition is an aqueous dispersion such as those used in paints.

The above known coating compositions, wherein the phosphate component is an ammonium polyphosphate with a degree of condensation within the range 20 and 400, are, however, not fully satisfactory in view of the fact that the polyphosphate has too good a solubility in water and that dispersion-based coating compositions undergo phase separation and sedimentation, after some time. The present invention now provides coating compositions which are free from the disadvantageous phenomena reported hereinabove.

The invention relates more particularly to an intumescent flame-retardant coating composition which substantially contains a film-forming binder, an ammonium polyphosphate, one or more substances carbonizing under the action of heat, dispersing agents and fillers, if desired, the ammonium polyphosphate having the general formula:

in which $n$ stands for a whole number averaging a value of more than 400 up to about 800 and the ratio of $m:n$ is about 1.

In accordance with a preferred feature of the present invention, the coating composition contains an ammonium polyphosphate having a degree of condensation $n$ within the range about 500 and 800, preferably 600 and 800. The coating composition should conveniently contain the ammonium polyphosphate in a proportion within the range about 5 and 25 weight %, based on the total composition.

The components making the coating composition may be used, for example, in the following quantitative proportions:

between about 15 and 35 weight % of film-forming binder,
between about 5 and 25 weight % of ammonium polyphosphate,
between about 10 and 25 weight % of one or more substances carbonizing under the action of heat,
between about 20 and 50 weight % of dispersing agents and, if desired,
between about 5 and 35 weight % of filler material.

The film-forming binder may be an aqueous plastics dispersion, such as an aqueous polyvinyl acetate dispersion or an aqueous dispersion of a vinyl acetate/dibutyl maleate-copolymer, or a solution of a resin in an organic solvent, such as a solution of a urea/formaldehyde resin in a solvent mixture of butanol and xylene.

The carbonizing substances suitable for use in the coating compositions of the present invention include, for example, dicyandiamide, pentaerythritol and/or melamine. The solid matter components should preferably be dispersed in water, ethyl acetate, butyl acetate, xylene or toluene to have a coating composition of good spreadability.

As indicated hereinabove, the coating composition may be further admixed with fillers imparting additional effects to it. The useful fillers include, for example, titanium dioxide, wollastonit, kaolin, magnesium silicate, potassium silicate or aluminum silicate, basic ceolite, carboxymethylcellulose, flame-retardant substances or pigments.

The preparation of the ammonium polyphosphate, which is used in the coating composition of the present invention, has been described in German Patent Specification P 23 30 174.8, wherein approximately equimolecular quantities of ammonium orthophosphate and phosphorus pentoxide are heated to temperatures between 170° and 350° in the presence of gaseous ammonia, while continuously and simultaneously mixing, kneading and comminuting the material to undergo reaction.

The coating compositions, which may be made by subjecting the individual components to simple mechanical blending, compare favorably with prior art coating masses of similar composition. This is due to the improved properties of the ammonium polyphosphate having a degree of condensation n of more than 400. They are more particularly very scarcely soluble in water and combine this with the property of producing a gel-forming effect in aqueous suspension. In other words, the polyphosphate component is not likely to be washed out under the influence of moisture from the coating compositions, which substantially retain their flame-retardant properties.

The gel-forming property of the ammonium polyphosphate used in this invention makes it possible for it to be uniformly distributed in the coating composition and for the distribution to be kept constant. It also enables the sedimentation of phosphate to be inhibited. In other words, the aqueous dispersions of the present coating compositions have an especially constant viscosity which remains substantially unaffected, even after prolonged storage.

The following Examples illustrate the invention and the favorable properties of the ammonium polyphosphate used in the coating compositions of the present invention. The ammonium polyphosphate is compared in the Examples with the following commercially available ammonium polyphosphates which are customarily used for intumescent flame-retardant coating compositions:

1. VP Kn 504: Manufacturer Hoechst Aktiengesellschaft, WERK KNAPSACK, Knapsack bei Koln
2. Phos-Check P/30: Manufacturer Monsanto Company, U.S.A.
3. Go Cut - 100: Manufacturer Asahi Chemical Ltd., Japan VP Kn 504 is a product containing 71–72% of phosphorus ($P_2O_5$) and 14–15% of nitrogen. It has a specific weight of 1.8 g/cc and decomposes at 330° C. A suspension of 1 g of the product in 100 g of water has a pH-value between 4.5 and 6.

Phos-Check P/30 is a product having the following physical properties:

| | |
|---|---|
| Phosphorus content: | 32 % |
| Specific weight: | 1.79 |
| Decomposition temperature: | 375–400° C |
| pH-value of a dispersion: 10 g/100 g $H_2O$ | 6.5 |
| Refractive index | 1.48–1.49. |

Go-Cut - 100 is a product containing 30–32% of phosphorus and 13–15% of nitrogen. The product has the following further properties:

| | |
|---|---|
| Specific weight: | 0.4–0.8 |
| Decomposition temperature: | 330–450° C |
| Refractive index: | 1.486. |

EXAMPLE 1

An ammonium polyphosphate as used in the present invention, which had a degree of condensation n of approximately 700, a m/n-ratio of 1 and a $P_2O_5$-content of 72 weight %, was tested as to its solubility and the result obtained was compared with the solubility values determined for the above commercially available ammonium polyphosphates. To this end, 5 g of ammonium polyphosphate was introduced into 100 cc of water and the whole was stirred for 1 hour at 40° C. The resulting solution was rapidly cooled to room temperature and insoluble fractions were removed by centrifugation over a period of 75 minutes at that temperature. The supernatant clear solution was decanted and boiled for a short while to effect cleavage of dissolved ammonium polyphosphate, if any. The conductivity, density and dissolved phosphate fractions were determined on aliquote portions of the individual solutions. The results obtained are indicated in the following Table 1:

Table I:

| Product | I | II | III |
|---|---|---|---|
| VP Kn 504 | 1665 | 1.003 | 20.9 |
| Phos-Check P/30 | 1644 | 1.003 | 19.5 |
| Go-Cut — 100 | 2018 | 1.004 | 31.8 |
| Product of invention | 605 | 1.001 | 9.3 |

With reference to the Table:
Column I: Electric conductivity of solution ($\mu S$ = microSiemens)
Column II: Density of solution at 20° C (g/cc)
Column III: Dissolved phosphate fraction at 40° C (wgt.%)

Table 1 shows that the product of the present invention is considerably less water-soluble than the comparative products.

EXAMPLE 2

The ammonium polyphosphate (invention) used in Example 1 was tested as to its sedimentation behaviour in water and a comparative test was made on Phos-Check P/30. To this end, two measuring cylinders were fed with equal volumes of an aqueous ammonium polyphosphate solution of certain concentration, the cylinders were shaken, then allowed to stand for a certain period of time, and the settling volumes were identified. The results obtained are indicated in the following Table 2.

Table II:

| I | II | III | IV |
|---|---|---|---|
| 1 | 1 | 1 | 100 |
| 1 | 2 | 1 | 100 |
| 1 | 3 | 1 | 100 |
| 5 | 1 | 6 | 100 |
| 5 | 2 | 6 | 99 |
| 5 | 3 | 6 | 99 |
| 10 | 1 | 13 | 100 |
| 10 | 2 | 13 | 99 |
| 10 | 3 | 13 | 98 |
| 50 | 1 | 81 | 100 |
| 50 | 2 | 79 | 99 |
| 50 | 6 | 78 | 98 |

With reference to Table II:
Column I: Concentration of aqueous ammonium polyphosphate suspension in weight %
Column II: Settling time in days
Column III: Settling volume of Phos-Check P/30, in % by volume
Column IV: Settling volume of ammonium polyphosphate of invention, in % by volume.

As can be seen (cf. Column IV of Table II), the suspension prepared from the ammo-nium polyphosphate of the present invention did not tend to sediment and was stable, as compared with the control product.

EXAMPLE 3

Two coating masses which had the following composition were tested as to their change in viscosity within 15 days. Coating composition I contained Phos-Check P/30 and coating composition II contained the ammonium polyphosphate of Example 1.

| | |
|---|---|
| 51 wgt % aqueous dispersion of a vinyl acetate/dibutyl maleate-copolymer | 47.5 weight % |
| Ammonium polyphosphate I or II | 7.5 weight % |
| Dicyandiamide | 6.7 weight % |
| Pentaerythritol | 5.8 weight % |
| Carboxymethylcellulose | 0.4 weight % |
| Titanium dioxide | 6.7 weight % |
| Water | 25.4 weight % |

The viscosity of the above masses was identified in a viscometer (Brookfield, Type RVT) at 0.5 rpm with the use of spindle C.

The results obtained are indicated in the following Table 3:

Table III:

| Viscosity identified after ......... days | Viscosity (SG) | |
|---|---|---|
| | Composition I | Composition II |
| 0 | 7 | 39 |
| 1 | 37 | 58 |
| 5 | 48 | 67 |
| 10 | 100 | 72 |
| 15 | 100 | 75 |

SG = Scale graduation of viscometer.

EXAMPLE 4

The viscosities of two coating compositions were determined after 12 day storage, as described in Example 3. The coating compositions contained the ammonium polyphosphates described in Example 3 and relatively little solid matter. They were more particularly composed of:

| | |
|---|---|
| 60 wgt % aqueous dispersion of a blend of 80 wgt % polyvinyl acetate and 20 wgt % tris-($\beta$-chloroethyl)-phosphate | 25.9 weight % |
| 56 wgt % aqueous polyvinyl acetate dispersion | 16.3 weight % |
| Ammonium polyphosphate I or II | 6.7 weight % |
| Dicyandiamide | 5.9 weight % |
| Pentaerythritol | 5.2 weight % |
| Carboxymethylcellulose | 0.4 weight % |
| Titanium dioxide | 5.9 weight % |
| Water | 33.7 weight % |

The viscosity was determined in a Brookfield viscometer, Type RVT, at 50 rpm with the use of spindle C. The coating composition containing Phos-Check P/30 had a viscosity equal to a needle deflection of 7.7 scale graduations. The coating composition of the present invention had a viscosity equal to a needle deflection of 16.9 scale graduations. The sedimentation volume of the control composition was about 90%, after 18 days. The coating compositions of the invention remained free from sedimentation.

EXAMPLE 5

The viscosities of two coating compositions A and B were determined in the manner described in Example 3. Coating composition A contained the ammonium polyphosphate Phos-Check P/30 and coating composition B contained the ammonium polyphosphate of Example 1, together with carboxymethylcellulose as a thickener. The coating compositions A and B were more particularly composed of:

| | Coating composition | |
|---|---|---|
| | A | B |
| 60 wgt % aqueous dispersion of a blend of 80 wgt % of polyvinyl acetate and 20 wgt % of tris-($\beta$-chloroethyl)-phosphate | 33.8 | 33.8 |
| 56 wgt % aqueous polyvinyl acetate dispersion | 21.3 | 21.3 |
| Ammonium polyphosphate | 8.7 | 8.7 |
| Dicyandiamide | 7.7 | 7.7 |
| Pentaerythritol | 6.8 | 6.8 |
| Titanium dioxide | 7.7 | 7.7 |
| Carboxymethylcellulose | 0.5 | — |
| Water | 13.5 | 14.0 |

The viscosity of the coating compositions was identified immediately after preparation and after 10 day-storage, and the results indicated in the following Table 4 were obtained:

Table IV:

| Coating composition | Viscosity (SG) | |
|---|---|---|
| | 0 days | 10 days |
| A | 50 | >100 |
| B | 63 | 92 |

Table 4 shows that coating composition B (invention) underwent a lesser change in viscosity than coating composition A, despite the fact the composition A contained a thickener.

EXAMPLE 6

The viscosity of two coating masses of the composition set forth below was determined in the manner described in Example 3. The solid matter components of the coating masses were dispersed in an organic solvent. The two coating masses contained the ammonium polyphosphates identified in Example 3.

| | |
|---|---|
| 60 wgt % aqueous dispersion of a urea/formaldehyde resin in a 7:3 blend of butanol and xylene | 27.9 weight % |
| Dicyandiamide | 10.9 weight % |
| Pentaerythritol | 5.0 weight % |
| 50 wgt % solution of a chloroparaffin (70 % chlorine) in butyl acetate | 0.8 weight % |
| Titanium dioxide | 1.4 weight % |
| Wollastonit | 3.3 weight % |
| Kaolin | 21.1 weight % |
| Mg-, K- Al-silicates | 4.8 weight % |
| Basic zeolite | 2.0 weight % |
| Ammonium polyphosphate I or II | 11.6 weight % |
| Ethyl acetate | 3.0 weight % |
| Xylene | 8.2 weight % |

The two masses underwent the following changes in viscosity within 12 days:

Table V:

| Viscosity measured after ......... days | Viscosity (SG) | |
|---|---|---|
| | Composition I | Composition II |
| 0 | 35 | 67 |
| 5 | 38 | 68 |
| 12 | 39 | 68 |

Composition I contained the ammonium polyphosphate Phos-Check P/30 and composition II contained the ammonium polyphosphate described in Example 1.

The above Example shows that the ammonium polyphosphate of the present invention has an increased viscosity even in organic dispersions and accordingly produces an intumescent effect which beneficially influences the stability of the coating composition.

We claim:

1. An improved intumescent flame-retardant coating composition comprising
  a. a film-forming binder selected from the group consisting of an aqueous polyvinyl acetate dispersion, an aqueous dispersion of a vinyl acetate-dibutylmaleate copolymer and a solution of a urea-formaldehyde resin in a solvent blend of butanol and xylene,
  b. about 5–25 weight %, based on the total weight of the composition, of an ammonium polyphosphate,
  c. a substance carbonizing under the action of heat selected from the group consisting of dicyanamide, pentaerythritol, melamine and mixtures thereof, and
  d. a dispersing agent, the improved coating composition containing as the b) component an ammonium polyphosphate of the formula $$H_{(n-m)+2}(NH_4)_m P_n O_{3n+1}$$

wherein $n$ is an average whole number of about 600–800 and the ratio of $m/n$ is about 1.

2. The coating compositions as claimed in claim 1, containing between about 15 and 35 weight % of film-forming binder, 5 and 25 weight % of ammonium polyphosphate, 10 and 25 weight % of at least one substance carbonizing under the action of heat, 20 and 55 weight % of dispersant and, if desired, 5 and 35 weight % of filler material.

3. The coating compositions as claimed in claim 1, wherein the dispersing agent is selected from the group consisting of water, ethyl acetate, butyl acetate, xylene or toluene.

4. The coating compositions as claimed in claim 2, wherein the fillers are selected from the group consisting of titanium dioxide, wollastonit, kaolin, magnesium silicate, potassium silicate or aluminum silicate, basic zeolite, carboxymethylcellulose, flame-retardant agents or pigments.

5. The coating compositions as claimed in claim 1, containing an ammonium polyphosphate being obtained by heating approximately equimolar proportions of ammonium orthophosphate and phosphorus pentoxide to temperatures within the range 170° and 350° C in the presence of gaseous ammonia while continually and simultaneously mixing, kneading and comminuting the material to undergo reaction.

* * * * *